Patented July 14, 1953

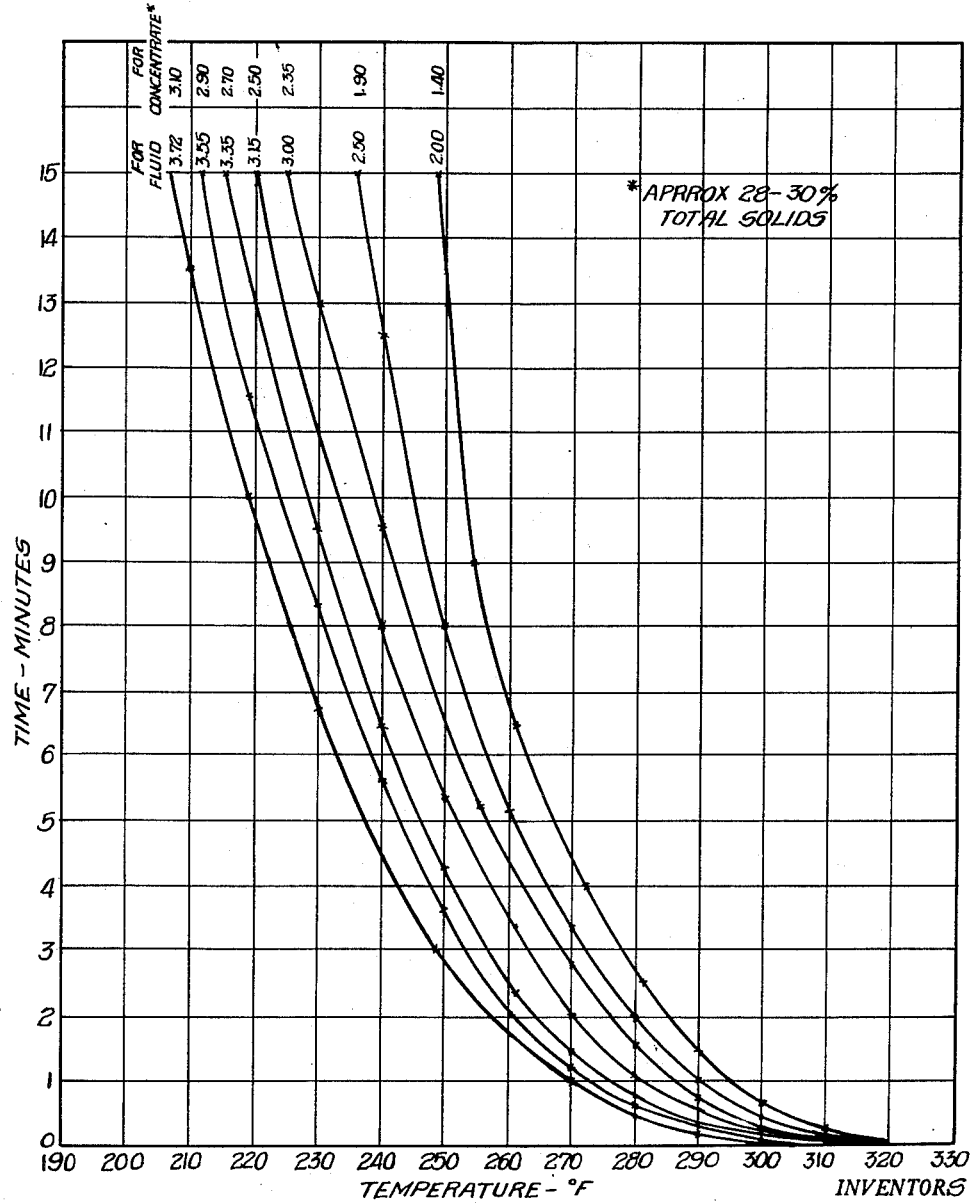

2,645,579

UNITED STATES PATENT OFFICE 2,645,579

DRIED MILK PRODUCT FOR USE IN COFFEE OR THE LIKE AND PROCESS OF PRODUCING SAME

Clayton A. Kempf, Berkeley, Calif., and Evelyn L. Blanchard, Washington, D. C., assignors to Golden State Company, Ltd., San Francisco, Calif., a corporation of Delaware Application July 13, 1950, Serial No. 173,538

8 Claims. (Cl. 99—56)

This invention relates to a new and improved dried milk product for use in coffee.

There is considerable need today for a dried milk product high in milk fat which is in condition suitable for use in coffee or similar products. For instance, machines are available today for dispensing coffee and similar hot drinks through the use of coin-controlled mechanism. In conjunction with such machines, it is desirable to have a milk product which is relatively high in milk fat and which may be introduced into coffee as a satisfactory substitute for fresh cream. Whereas fresh cream can be handled and stored only with difficulty and under constant refrigeration, a substitute for fresh cream in the form of a dried milk product would be free of these objections and has been sought by many workers in this field.

Dried milk products high in milk fats have been produced in the past, but in all instances, as far as these applicants know, such products, when introduced into coffee directly and without first being reconstituted, suffer the disadvantage of undergoing coagulation of the proteins and of exhibiting an unsightly appearance due to the coagulation action, referred to as "feathering."

It is an object of this invention to provide a dried milk product having any desired quantity of milk fat, which can be introduced directly and without first being reconstituted, into coffee and similar beverages without suffering coagulation of the proteins or "feathering" now characteristic of such products.

These applicants have discovered that if milk, with the desired milk fat content, first has added thereto a particular quantity of disodium phosphate or an equivalent amount of any hydrate thereof and is then subjected to a particular heat treatment as hereinafter more fully pointed out, the milk product undergoes a change which enables it to be used in coffee and similar products by direct introduction, without being reconstituted, and without undergoing that unsightly coagulation of the proteins known as feathering.

In order to carry out this invention, fresh milk is first standardized to the desired ratio of fat to milk solids not fat. By way of example, a ratio of 1 to 1 may be used, with the result that good color and flavor are given to coffee. It is contemplated, however, that the ratio of fat to solids not fat may be varied as desired within the range of from approximately one part fat to approximately three parts solids not fat to approximately three parts fat to approximately one part solids not fat. After the milk to be treated has been properly standardized, the selected amount of disodium phosphate or one or more hydrates thereof is added thereto and thereafter the mixture is subjected to a particular heat treatment, as indicated on the graph shown in the accompanying drawing.

By consulting the drawing, it will be noted that various prescribed quantities of disodium phosphate may be used, and that for each quantity a curve is plotted on a time-temperature chart in such manner as to show the exact period of heat treatment preferred for each temperature that may be employed, and vice versa. It will also be noted from the chart that the minimum quantity of phosphate that should be employed in practicing the invention is in the neighborhood of approximately 2% for fluid milk and 1.40% for concentrated milk, based on milk solids not fat, and that the maximum quantity to be employed for each type of milk is approximately 3.72% and 3.10%, respectively. The intermediate quantities are represented by intermediate curves, all as shown on the drawing.

Accordingly, by consulting the drawing as a guide and selecting thereon the amount of phosphate to be employed, the time and temperature characteristics of the heat treatment to be used can be readily ascertained, but when all other things are equal, the best phosphate level will be found at about the middle of the range shown on the guide, and the preferred temperature to be used is that which, according to the chart, will require a heating period of between one-half and two minutes. It is to be understood, however, that the temperature and heating period can be selected according to any values within the range of the guide, depending on the type of equipment employed.

When disodium phosphate is added to fluid milk in quantity of approximately 3.15% based on milk solids not fat, the heating treatment requires a temperature of 280° F. for a period of one minute. When the phosphate level in fluid milk is increased materially above the 4% of the milk solids not fat content, the finished product will run somewhat high in alkalinity and will have a salty taste. If the heat treatment does not equal that called for in the guide, the coffee test will be poor and some unsightly coagulation or feathering will occur. If the phosphate level in fluid milk is too low, that is to say, appreciably below 2.0% of milk solids not fat, then the higher temperature or longer time, or both, required to produce a satisfactory coffee test will cause browning and staling of the product.

After the product is given the proper heat treatment, it may next be evaporated to a final concentration of from approximately 35% to approximately 50% total solids by a procedure which employs substantially less heat treatment than that used on the fluid prior to evaporation. The amount of solids in the final concentrate should be selected to produce the optimum results depending upon the type of drying equipment to be employed in the next succeeding step of the process.

After evaporation, the product is spray dried in a manner to reduce its moisture content to the level of from approximately 1% to approximately 2%. The atomizing conditions employed can be controlled to give the desired texture or granulation in the finished product.

Another method by which this invention may be practiced is as follows: The milk is first standardized to the desired ratio of fat to milk solids not fat which, by way of illustration may be 1 to 1. Thereafter, while using substantially less heat treatment than is to be employed in the next succeeding step, the product is evaporated to increase the solids content to a level of approximately 28% to 30% by weight. Thereafter, disodium phosphate or its equivalent hydrate is added, which preferably may be in quantity of approximately 2.5% based on the milk solids not fat. Thereafter, and according to the dictates of the guide shown in the drawing, a heat treatment at substantially 280° F. for approximately one minute is carried out. Thereafter, the product so treated may be further evaporated to increase its solids content to a level within the range of approximately 35% to 50% by weight.

Finally, the concentrated product is spray dried by the utilization of conventional spray drying equipment to produce a powder having a moisture content of between approximately 1% and 2% by weight of the powder. It is not critical to have the phosphate introduced all at one time, provided that the prescribed quantity is present at the time the mixture is subjected to heat treatment indicated by the guide. Accordingly, if it should be desired to do so, a portion of the required disodium phosphate could be introduced initially in the fluid milk and the remaining portion subsequently added to the concentrate.

It is to be noted that in the second example given above, wherein the phosphate is added after some concentration of the milk has been effected, smaller additions of phosphate may be employed as compared with requirements when the phosphate is added to the fluid milk. This fact is noted on the accompanying chart, wherein it shows, for instance, that only 1.40% of phosphate is required when the addition is made to a concentrate of approximately 28% to 30% solids by weight as compared to 2% of phosphate when the addition is made to fluid milk under the same heat treatment conditions. It will therefore be seen that this also means that if the same amount of phosphate is added to a concentrate that would be added to fluid milk, then, in that event, a lower heat treatment can be used in processing the concentrate. With the same conditions of heat treatment, about 0.6% less disodium phosphate based on milk solids not fat can be used.

It should also be noted that the effect of the phosphate, when treated according to this invention, is specific in character and that tests have shown that sodium citrate, sodium carbonate, and sodium hydroxide will not produce equivalent results though treated in the same manner. Furthermore, the effect here obtained is not one of adjusting the pH alone. The original pH of the milk is raised by the presence of disodium phosphate, but the subsequent heat treatment restores the pH value to the range of the pH of the original milk. In addition, it should be noted that both the addition of disodium phosphate and the heat treatment as prescribed are required to produce a product which disperses in coffee without undergoing the unsightly coagulation or feathering.

As a possible explanation as to what occurs in practicing this invention, it may be said that the joint action of the disodium phosphate and the heat treatment produces a product, the casein of which resists coagulation when the product is stirred into coffee, or at least one the casein of which coagulates so slowly that there is ample time during the period when the product is being stirred into coffee to allow the stirring activity to so distribute the coagulated particles that coagulation is not noticeable to the eye.

Sugar, such as sucrose, glucose, or other sugars, may be added to the formula to enhance the physical properties of the powder, such as, for instance, making the product more granular. However, if sugar is added prior to the heat treatment with the disodium phosphate, there is a tendency toward excessive browning and staling. Accordingly, if sugar is to be added it is best to add it after the heat treatment with disodium phosphate has been carried out.

Homogenization may be performed on either the fluid milk or the concentrated milk without materially affecting the ability of the product to be introduced into coffee without feathering.

The effect and purpose of the disodium phosphate addition to this product is different from that of disodium phosphate as used in evaporated milk. Disodium phosphate is added to evaporated milk to control viscosity and render it stable to sterilization conditions, and for such purpose the quantity employed is much less than the amount used in the production of the product of this invention. Furthermore, sodium citrate serves the same purpose as disodium phosphate in the control of viscosity and stabilizing sterilizing conditions of evaporated milk, but sodium citrate does not give results equivalent to the results produced by disodium phosphate as employed in the production of the product of this invention for use in coffee.

The product of this invention is distinctive and differs in kind from the products of the prior art in that it contains disodium phosphate in quantity of from approximately 1.40% to approximately 4% by weight based on the milk solids not fat, and in that it has been subjected to a particular heat treatment as taught herein which has served to render the proteins, which are largely casein, capable of dispersing, when directly added to hot coffee, without preliminary reconstitution and thereby exhibiting a smooth, uncoagulated appearance in the coffee when so introduced.

If disodium phosphate is used in quantity substantially less than the minimum amounts prescribed by the chart shown in the accompanying drawing, the results will be that the product shows a poor coffee test because of insufficient disodium phosphate addition. Efforts to improve the product through increased heat treatment will result in browning and staling of the product during storage. On the other hand, if quantities of disodium phosphate are used substantially in excess of the maximum amounts prescribed by the chart shown in the drawing, the resulting product will likewise produce poor coffee tests because the corresponding heat treatment is insufficient to produce the desired characteristics. Furthermore, additional amounts of disodium phosphate will only serve to produce a strong salty taste and excessive alkalinity.

What is claimed is:

1. In the process of producing a dry milk product which is free from the tendency to feather when introduced into coffee, the steps of introducing, when processing fluid milk, from approximately 2% to approximately 3.72% and, when processing concentrated milk having a solids content of approximately 28% to 30%, from approximately 1.40% to approximately 3.10% based on milk solids not fat of a substance selected from the group consisting of disodium phosphate and hydrates thereof, and subjecting the milk to a temperature of from approximately 205° F. to 320° F. for a period varying from substantially instantaneous heat treatment for the highest temperature to approximately fifteen minutes for the lowest temperature but not substantially below approximately 255° F. for the lowest quantity of said selected added substance.

2. In the process of producing a dry milk product which is free from the tendency to feather when introduced into coffee, the step of subjecting milk to the procedure defined in claim 1, and thereafter concentrating the same to a total solids content of from approximately 35% to approximately 50% while employing temperatures less than the temperatures employed in the initial heat treatment, and thereafter drying said product.

3. In the process of producing a dry milk product which is free from the tendency to feather when introduced into coffee, the step of subjecting milk to the procedure defined in claim 1, and thereafter concentrating the same to a total solids content of from approximately 35% to approximately 50% while employing temperatures less than the temperatures employed in the initial heat treatment, and thereafter spray drying said product.

4. In the process of producing a dry milk product which is free from the tendency to feather when introduced into coffee, the steps of standardizing milk to provide a fat content of from approximately 25% to approximately 75% based on total solids, thereafter concentrating said product to a solids content of approximately 28% to 30%, adding from approximately 1.40% to approximately 3.10% based on milk solids not fat of a substance selected from the group consisting of disodium phosphate and hydrates thereof, and subjecting the milk to a temperature of from approximately 205° F. to 320° F. for a period of from substantially an instant for the highest temperature to approximately fifteen minutes for the lowest temperature but not substanially below 255° F. for the lowest quantity of said selected added substance.

5. In the process of producing a dry milk product which is free from the tendency to feather when introduced into coffee, the steps of subjecting milk to the procedure defined in claim 4, thereafter further concentrating to a solids content of from approximately 35% to approximately 50% while employing temperatures less than the temperatures employed for the initial heat treatment, and finally drying said product to form a powder.

6. In the process of producing a dry milk product which is free from the tendency to feather when introduced into coffee, the steps of standardizing milk to provide a fat content of from approximately 25% to approximately 75% based on total solids, thereafter adding from approximately 2% to approximately 3.72% based on milk solids not fat of a substance selected from the group consisting of disodium phosphate and hydrates thereof, subjecting the milk to a temperature of from approximately 205° F. to approximately 320° F. for a period of substantially an instant for the highest temperature to approximately fifteen minutes for the lowest temperature but not substantialy below 255° F. for the lowest quantity of said selected added substance.

7. In the process of producing a dry milk product which is free from the tendency to feather when introduced into coffee, the steps of subjecting milk to the procedure defined in claim 6, and thereafter concentrating the same to a total solids content of from approximately 35% to approximately 50% while employing temperatures less than the temperatures employed in the initial heat treatment, and thereafter drying said product.

8. A dry milk product having a moisture content of between approximately 1% and 2% by weight of the product and containing from substantially 25% to substantially 75% of fat by weight based on total solids, which contains casein capable of dispersing when directly added to hot coffee without preliminary reconstitution to give a smooth, uncoagulated appearance to the coffee, and which contains approximately 1.40% to approximately 4% by weight based on milk solids not fat of a substance selected from the group consisting of disodium phosphate and hydrates thereof.

CLAYTON A. KEMPF.
EVELYN L. BLANCHARD.

References Cited in the file of this patent

UNITED STATES PATENTS

| Number | Name | Date |
|---|---|---|
| 2,011,558 | Berlatsky | Aug. 20, 1935 |
| 2,473,493 | Otting et al. | June 14, 1949 |

OTHER REFERENCES

G. F. Huniker, "Condensed Milk and Milk Powder" published by the author, La Grange, Illinois, 1946, sixth edition, pages 251, 257 to 262, 328.